United States Patent [19]

Erickson

[11] 4,454,724

[45] Jun. 19, 1984

[54] AQUEOUS ABSORBENT FOR ABSORPTION CYCLE HEAT PUMP

[76] Inventor: Donald C. Erickson, 1704 S. Harbor La., Annapolis, Md. 21401

[21] Appl. No.: 428,483

[22] Filed: Sep. 29, 1982

[51] Int. Cl.³ .............................................. F25B 15/00
[52] U.S. Cl. ........................................ 62/112; 252/71
[58] Field of Search ................. 62/112; 252/67, 68, 252/69, 71

[56] References Cited

U.S. PATENT DOCUMENTS 4,311,024  1/1982  Itoh et al. .................... 62/112

FOREIGN PATENT DOCUMENTS 55-10830  3/1980  Japan ....................... 62/112

OTHER PUBLICATIONS

*Russian Journal of Inorganic Chemistry*, (Eng. Translation), vol. 8, No. 12, Dec. 1963, pp. 1436–1441.

*Primary Examiner*—Lloyd L. King

[57] ABSTRACT

The invention comprises solution compositions suitable for absorbing and desorbing useful quantities of water vapor at high boiling point elevations, and, hence, which are useful in conjunction with $H_2O$ as the absorbent pair in absorption cycle heat pumps. The nonaqueous component of the solution is comprised of at least 35 mole percent $LiNO_3$ and at least 35 mole percent alkali nitrite. The absorbent is particularly useful in high temperature absorption cycles, i.e., with maximum temperatures in the range of 130° C. to 260° C. or even higher.

8 Claims, No Drawings

AQUEOUS ABSORBENT FOR ABSORPTION CYCLE HEAT PUMP

TECHNICAL FIELD

This invention relates to solution compositions which absorb and desorb useful quantities of water vapor at high boiling point elevation, and, hence, are useful in absorption cycle devices such as heat pumps. The solution and the absorption cycles which employ it are particularly advantageous at high temperatures, e.g., up to 260° C. and even higher.

BACKGROUND ART

The main function of any heat pump, including refrigerators, is to raise the temperature of a supply of heat. In an absorption cycle heat pump, this is caused to occur by lowering the temperature of another quantity of heat. The heat whose temperature is to be raised is applied to a boiler (or evaporator), thereby causing a working medium such as $H_2O$ to evaporate. The vapor is then absorbed in an absorbent solution having a substantial boiling point elevation—this causes the heat to be released at higher temperature. The absorbent solution is then returned to its original concentration, ready for reuse, by the action of the heat whose temperature is to be lowered. That heat is applied to a generator, causing working medium to boil out of the solution at a substantial boiling point elevation, and finally the vapor condenses at its boiling point, releasing the heat which was input at the generator at a much lower temperature. The absorber and evaporator operate at approximately the same pressure, and the generator and condenser also operate at about the same pressure, but one which is substantially different from the absorber/evaporator pressure. When the generator/condenser pressure is higher than the absorber/evaporator pressure, the cycle is the conventional one found in refrigerators and air conditioners, and is herein called forward cycle: heat is input at the two temperature extremes, and is delivered at midpoint temperatures. Conversely, when the pressures are reversed, the resulting cycle is herein called reverse cycle: heat is input at mid-temperatures, and is rejected at both the highest cycle temperature and the lowest cycle temperature. Both cycles are known in the prior art—see for example U.S. Pat. No. 4,350,571 and application Ser. No. 06/188,527 filed Sept. 18, 1980 by D. C. Erickson.

The amount of temperature increase provided by an absorption heat pump, also called its temperature lift, is thus seen to be determined by the boiling point elevation of the absorbent solution. The net lift realized will be the boiling point elevation minus the heat exchanger temperature differentials; thus, practical machines require boiling point elevations on the order of 30° C. or more. Although in principle almost any material will provide almost any degree of boiling point elevation, there is a practical limit imposed by the requirement that the absorbent solution transport the working medium from the absorber to the generator. Thus, the absorbent solution must have an acceptably large carrying capacity for the working medium at the high boiling point elevation condition, as otherwise excessively high solution circulation rates (and attendant high solution heat exchanger heat losses) would be experienced. The carrying capacity is proportional to the derivative of the solution concentration with respect to the boiling point elevation, and this is the quantity which must be acceptably large at high boiling point elevations.

In addition to high boiling point elevation and acceptable carrying capacity, the absorbent solution should be reasonably noncorrosive such that ordinary materials of construction can be used; it should not thermally degrade or decompose at high use temperatures; it must not freeze or crystallize at normally encountered use conditions; it should have acceptable liquid properties such as low viscosity for pumping, minimal foaming tendency, easily boil, etc: it should be relatively non toxic, non explosive, and nonflammable; it should be reasonably available; and it should have a low vapor pressure so as not to require rectification, as in $NH_3$-$H_2O$ systems.

The composition described below satisfies all these criteria. For higher temperature absorption heat pumps, water is clearly the preferred choice for working medium. Although many absorbents have been proposed and used for $H_2O$ in the past, they all introduce disadvantages when employed in high temperature absorption cycles. Most previous research has centered on the refrigeration or air conditioning applications of these cycles, not involving high temperatures. The lithium halides, $H_2SO_4$, and $NaOH$ all cause excessive corrosion to ordinary materials of construction above about 180° C. Various organic absorbents such as the glycols are subject to thermal degradation, have undesirably high vapor pressures, and have undesirably low carrying capacity.

Prior art patents describing absorption cycle absorbent compositions include U.S. Pat. Nos. 2,802,344, 4,005,584, 4,018,694, 4,172,043, 4,251,382, and 4,272,389, and 2,986,525.

DISCLOSURE OF INVENTION

The desired and unexpectedly advantageous absorption solution properties are obtained from a composition of matter comprised of at least 35 mole percent $LiNO_3$ and at least 35 mole percent alkali nitrite. The composition is normally employed in aqueous solution at concentrations containing between 2 and 50 weight percent $H_2O$. The high Li content provides high carrying capacity at high boiling point elevations, whereas the approximately equal nitrate and nitrite content lowers the melting point of both the anhydrous and aqueous solution. The composition is particularly useful in absorption cycles operating at high temperatures, e.g., up to 260° C. or higher, and is applicable to all cycle variations: forward or reverse cycle, multieffect generators or absorbers, etc.

BEST MODE FOR CARRYING OUT THE INVENTION

Example 1

A composition consisting of 50 weight percent $LiNO_3$, 30 weight percent $NaNO_2$, and 20 weight percent $KNO_2$ was tested for boiling point elevation and carrying capacity. The respective mole percentages are approximately 52, 31, and 71%. The following results were obtained, as a function of solution concentration (e.e., the weight percent nonaqueous component, where the balance is $H_2O$):

| pressure (torr) | concentration (w/o) | boiling point (°C.) | b.p. elevation (°C.) |
|---|---|---|---|
| 190 (¼ ATA) | 0 | 82 | 0 |
| | 81.8 | 110 | 28 |
| | 86.1 | 119 | 37 |
| | 89.6 | 129.5 | 47.5 |
| | 92.4 | 139.6 | 57.6 |
| 95 (⅛ ATA) | 0 | 65.8 | 0 |
| | 89.2 | 110 | 44.2 |
| | 92.4 | 119 | 53.2 |
| | 94.6 | 129.5 | 63.7 |
| | 96.1 | 139.6 | 73.8 |

As can be seen, the solution provides acceptable carrying capacity (e.g., is reasonably dilute) out to boiling point elevations of at least 50° or 60° C. Also, comparable concentrations give comparable boiling point elevations at any pressure.

The above composition in anhydrous form turns very viscous and begins to freeze at about 106° C., but is liquid to much lower temperatures in aqueous form.

Example 2

A composition of 50 mole percent $LiNO_3$, 25 mole percent $LiNO_2$, and 25 mole percent $NaNO_2$ (all plus or minus 10%) provides even greater carrying capacity (i.e., more dilute solutions) at comparable boiling point elevations than does the Example 1 mixture. However, it introduces two disadvantages—it has a higher melting point, and, hence, is susceptible to freezing, particularly during cooldown and shutdown. This can be counteracted by providing a reservoir of dilution water which is added to the solution during shutdown, then boiled out and separately condensed and stored during startup. An oversize condenser would also accomplish this, by providing a controllable liquid drain valve. This technique applies equally to other compositions, e.g., the Example 1 composition.

The alkali nitrites, and particularly $LiNO_2$, are susceptible to carbonation from $CO_2$. Hence, the solution and the entire absorption cycle should be hermetically sealed, as is common practice with LiBr units.

It may be desirable to add other constituents to the compositions described above. Adding lithium halides (e.g., LiBr or LiCl) will extend the carrying capacity. Certain organic additives e.g., glycols or alcohols, will lower the melting point. Other additives may promote boiling, decrease foaming tendency, etc. In general, additions up to 30 weight percent are acceptable when not precluded by the intended use temperature.

It will be apparent to the artisan that the low melting point of this composition and high thermal stability will make it useful in other applications as well.

I claim:

1. An aqueous absorbent solution comprised of water and a nonaqueous component wherein the nonaqueous component comprises at least 35 mole percent $LiNO_3$ and at least 35 mole percent alkali metal nitrite, and wherein water comprises between 2 and 50 weight percent of the solution.

2. The composition according to claim 1 wherein the nonaqueous component consists of 50 weight percent $LiNO_3$, 30 weight percent $NaNO_2$, and 20 weight percent $KNO_2$.

3. The composition according to claim 1 wherein the nonaqueous component consists of 40 to 60 weight percent $LiNO_3$, 20 to 30 weight percent $LiNO_2$, and 20 to 30 weight percent $NaNO_2$.

4. The composition according to claim 1 wherein the nonaqueous component is comprised additionally of up to 30 weight percent of lithium halide, glycol, or alcohol.

5. In a process in which steam is absorbed at a first pressure into an absorbent solution at a first temperature which is at least 30° C. above the steam saturation temperature, and in which steam at a second pressure different from the first is desorbed out of the absorbent solution at a second temperature which is at least 30° C. above saturation temperature of the second pressure steam, the improvement comprising:

providing as the absorbent solution an aqueous solution in which the nonaqueous component is comprised of at least 35 mole percent $LiNO_3$ and at least 35 mole percent alkali nitrite.

6. The process according to claim 5 further comprising raising absorbent pressure for the desorption step, whereby a forward cycle results.

7. The process according to claim 5 further comprising lowering absorbent pressure for the desorption step, whereby a reverse cycle results.

8. The process according to claim 5 in which the nonaqueous component is comprised of at least 25 mole percent $N_2NO_2$.

* * * * *